United States Patent
Won

(10) Patent No.: US 9,172,285 B2
(45) Date of Patent: Oct. 27, 2015

(54) LINEAR STEPPING MOTOR HAVING A PLATE COVER FOR FIXING A BEARING IN A STRUCTURE

(75) Inventor: Yu Man Won, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 238 days.

(21) Appl. No.: 13/259,812

(22) PCT Filed: Apr. 8, 2010

(86) PCT No.: PCT/KR2010/002149
§ 371 (c)(1),
(2), (4) Date: Sep. 23, 2011

(87) PCT Pub. No.: WO2010/117216
PCT Pub. Date: Oct. 14, 2010

(65) Prior Publication Data
US 2012/0019082 A1    Jan. 26, 2012

(30) Foreign Application Priority Data

Apr. 8, 2009    (KR) .................. 10-2009-0030283

(51) Int. Cl.
*H02K 37/24*    (2006.01)
*H02K 5/16*    (2006.01)
(Continued)

(52) U.S. Cl.
CPC .. *H02K 7/06* (2013.01); *H02K 5/16* (2013.01); *H02K 5/1732* (2013.01); *H02K 7/083* (2013.01); *F16H 2025/2078* (2013.01); *H02K 37/14* (2013.01)

(58) Field of Classification Search
CPC ....... H02K 37/00; H02K 37/04; H02K 37/02; H02K 37/24; H02K 5/16; H02K 7/08

USPC .......... 310/49.01, 49.02, 49.11, 49.13, 49.18, 310/12.14, 85, 90, 91; 384/537
IPC ...................... H02K 37/00,37/04, 37/02, 37/24
See application file for complete search history.

(56) References Cited

U.S. PATENT DOCUMENTS 3,735,165 A * 5/1973 Touchman et al. ........ 310/49.43
6,276,838 B1 * 8/2001 Lauk et al. .................... 384/537
(Continued)

FOREIGN PATENT DOCUMENTS

CN        2845300 Y    12/2006
JP        08-266035 A  10/1996
(Continued)

OTHER PUBLICATIONS

International Search Report in International Application No. PCT/KR2010/002149, filed Apr. 8, 2010.

*Primary Examiner* — Michael Andrews
(74) *Attorney, Agent, or Firm* — Saliwanchik, Lloyd & Eisenschenk

(57) ABSTRACT

The present invention relates to a linear stepping motor, the motor characterized by: a housing; a stator mounted inside the housing: a rotor rotatively arranged at an inner surface of the stator and mounted with a female screw threaded to a lead screw; a mounting plate fixed at a lateral surface of the housing for passing the lead screw; and a plate cover coupled between the mounting plate and the housing configured to prevent a bearing rotatively supporting the female screw from axially moving, such that the bearing can be securely fixed in a simple structure by the plate cover itself to allow a free design in the size of a central hole of the housing or the size of an outer diameter of a magnet regardless of the size of outer diameter of the bearing, and the bearing is securely fixed to the plate cover by caulking to prevent the bearing from moving axially, whereby vibration and noise can be remarkably reduced to enhance the reliability of the product.

9 Claims, 7 Drawing Sheets

(51) Int. Cl.
*H02K 7/08* (2006.01)
*H02K 7/06* (2006.01)
*H02K 5/173* (2006.01)
*H02K 37/14* (2006.01)
*F16H 25/20* (2006.01)

(56) References Cited

U.S. PATENT DOCUMENTS

| | | | |
|---|---|---|---|
| 6,955,474 B2 * | 10/2005 | Barbiero et al. | 384/537 |
| 7,047,833 B2 * | 5/2006 | Durschmied | 74/89.32 |
| 2002/0043880 A1 * | 4/2002 | Suzuki et al. | 310/12 |
| 2004/0164623 A1 | 8/2004 | Suzuki et al. | |
| 2005/0275297 A1 * | 12/2005 | Suzuki et al. | 310/71 |
| 2012/0019082 A1 * | 1/2012 | Won | 310/49.01 |

FOREIGN PATENT DOCUMENTS

| | | |
|---|---|---|
| JP | 11-155275 A | 6/1999 |
| JP | 2004-260950 A | 9/2004 |
| JP | 2004-312821 A | 11/2004 |

* cited by examiner

Fig. 1 - Prior Art
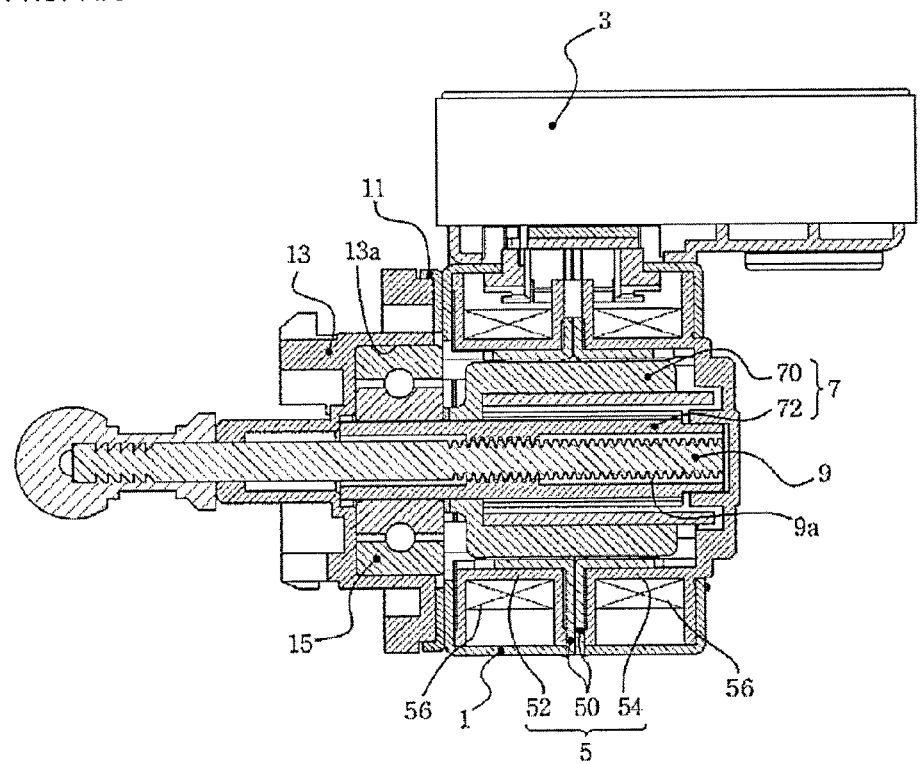
Fig. 2 - Prior Art
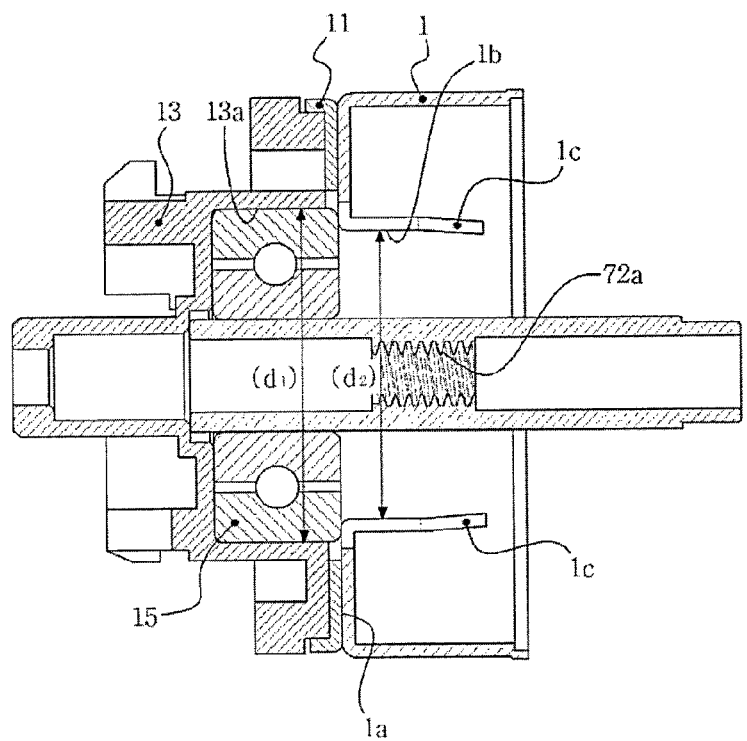

LINEAR STEPPING MOTOR HAVING A PLATE COVER FOR FIXING A BEARING IN A STRUCTURE

CROSS-REFERENCE TO RELATED APPLICATIONS

This application is the U.S. national stage application of International Patent Application No. PCT/KR2010/002149, filed Apr. 8, 2010, which claims priority to Korean Application No. 10-2009-0030283, filed Apr. 8, 2009, the disclosures of each of which are incorporated herein by reference in their entirety.

TECHNICAL FIELD

The present invention relates to a linear stepping motor.

BACKGROUND ART

Generally, a linear stepping motor is a motor in which a rotor rotates at a predetermined angle to allow a lead screw to linearly and reciprocally move. The linear stepping motor is featured by the fact that the number of an input pulse and a rotation angle of a motor are proportionate to accurately control the rotation angle, such that the linear stepping motor is widely used that needs a precise control.

The linear stepping motor is largely utilized in the fields of NC (numerical control) machines, industrial robots, and office automation machines such as printers and copiers, and is particularly used as an actuator adjusting an illumination angle of a head light of an automobile.

FIG. 1 is a cross-sectional view illustrating an example of a linear stepping motor according to prior art.

Referring to FIG. 1, the conventional linear stepping motor includes a housing 1, a control box 3 mounted outside of the housing 1, a stator 5 installed inside the housing 1, a rotor 7 rotatively installed inside the stator 5 to be rotated by the electromagnetic force, and a lead screw 9 linearly and movably installed inside the rotor 7 to linearly move in association with the rotating movement of the rotor 7.

The stator 5 includes a pair of tooth yokes 50, and first and second coil bobbins 52, 54 wound by a coil 56 and arrange in parallel outside of the tooth yokes 50.

The rotor 7 includes a magnet 70 rotatively mounted inside the tooth yoke 50 at a predetermined gap, and an arm screw 72 installed to rotate along with the magnet 70 inside the magnet 70 and formed therein with a female screw 72 formed with female screw threads 72a.

Furthermore, the lead screw 9 is formed at a periphery thereof with a male screw threads 9a meshed with the female screw threads 72a of the female screw 72 to linearly and reciprocally move in response to the rotation of the female screw 72.

FIG. 2 is a schematic view of essential parts illustrating a bearing installation structure of a linear stepping motor according to prior art.

Referring to FIG. 2, the linear stepping motor is configured in such a manner that a plate cover 11 is welded to one side of a housing 1, where the plate cover 11 is coupled with a mounting plate 13. The mounting plate 13 is formed with an installation groove 13a inside of which is installed with a bearing 15 for rotatively supporting one side end of the lead screw 9. At this time, the bearing 15 is blocked by a lateral wall 1a of the housing 1 to be prevented from being disengaged.

However, the conventional linear stepping motor suffers from a disadvantage in that it must satisfy a condition in which a diameter d2 of a central hole 1b formed at the center of the housing 1 is smaller than an outer diameter d1 of the bearing 15 to prevent the bearing 15 from disengaging (d1>d2). As a result, the diameter of the central hole 1b must be designed based on the outer diameter of the bearing 15 to limit the designing condition of the housing 1.

In association therewith, the size of the magnet 70 positioned inside a tooth 1c bent from the central hole 1b must be determined by the diameter of the central hole 1b, whereby the size of the magnet 70 is also restricted based on the limiting condition in which the diameter of the central hole 1b cannot be arbitrarily enlarged or reduced.

Furthermore, in order for the housing 1 to precisely apply pressure to the bearing 15, a coupling accuracy of a mounting plate 13, a plate cover 11 and the housing 1 must be very important, and in order to satisfy the coupling accuracy of these elements, a manufacturing cost is inevitably increased to meet the meticulous design conditions and manufacturing processes. If the meticulous design conditions are not met, vibration and noise are inevitably generated by the axial motion of the bearing 15 to become causes of defect of the product.

DISCLOSURE OF INVENTION

Technical Problem

Accordingly, the present invention has been made to solve the above-mentioned problems occurring in the prior art and provides additional advantages, by providing a linear stepping motor configured to improve a plate cover structure in which a bearing is securely fixed by a plate cover itself to obtain a design freedom of other elements regardless of size of the bearing. In addition, the secured fixation of the bearing prevents the bearing from moving, whereby the noise and vibration can be remarkably reduced.

It should be emphasized, however, that the present invention is not limited to a particular disclosure, as shown and described. The particular embodiments disclosed herein are illustrative only, as the invention may be modified and practiced in different but equivalent manners apparent to those skilled in the art having the benefit of the teachings herein.

Solution to Problem

According to a first aspect of the present invention, there is provided a linear stepping motor, characterized by: a housing; a stator mounted inside the housing: a rotor rotatively arranged at an inner surface of the stator and mounted with a female screw threaded to a lead screw; a mounting plate fixed at a lateral surface of the housing for passing the lead screw; and a plate cover coupled between the mounting plate and the housing configured to prevent a bearing rotatively supporting the female screw from axially moving.

In some exemplary embodiments, the plate cover is characterized by: a pocket unit into which the bearing is inserted; a first support unit formed at a distal end of the pocket unit to support a lateral surface of the bearing; and a second support unit formed at the other distal end of the pocket unit to support the other surface of the bearing.

In some exemplary embodiments, the plate cover is further characterized by: a fixation unit extended from the other distal end of the pocket unit to the external direction to be fixed at a lateral surface of the housing.

In some exemplary embodiments, the first support unit and the second support unit are respectively supported to both lateral surfaces of an external member of the bearing.

In some exemplary embodiments, the plate cover is further characterized by a coupling protruder formed at the fixation unit to be press-fitted to a coupling slot formed at the mounting plate.

In some exemplary embodiments, the first support unit and the second support unit are formed as bending parts by bending both distal ends of the pocket unit to be hitched at both lateral surfaces of the bearing.

In some exemplary embodiments, the first support unit and the second support unit are formed in at least one or more caulked shapes.

In some exemplary embodiments, one of the first support unit and the second support unit is formed in a bending part while the other is formed in at least one or more caulked shapes.

In some exemplary embodiments, the pocket unit is inserted into an insertion groove part formed at the mounting plate.

In some exemplary embodiments, the housing is formed with a tooth forming a central hole, and an inner diameter of the tooth is larger than an outer diameter of the bearing.

In some exemplary embodiments, the linear stepping motor is used as an actuator of an illumination angle adjusting apparatus configured to adjust an illumination angle of an automobile headlight.

Advantageous Effects of Invention

The linear stepping motor according to the present invention is advantageous in that a bearing can be securely fixed in a simple structure by a plate cover itself to allow a free design in the size of a central hole of a housing or the size of an outer diameter of a magnet regardless of the size of outer diameter of the bearing. Another advantage is that the bearing is securely fixed to the plate cover by caulking to prevent the bearing from moving axially, whereby vibration and noise can be remarkably reduced to enhance the reliability of the product.

BRIEF DESCRIPTION OF DRAWINGS

FIG. 1 is a cross-sectional view illustrating an example of a linear stepping motor according to prior art.

FIG. 2 is a schematic view of essential parts illustrating a bearing installation structure of a linear stepping motor according to prior art.

MODE FOR THE INVENTION

Figure 3:
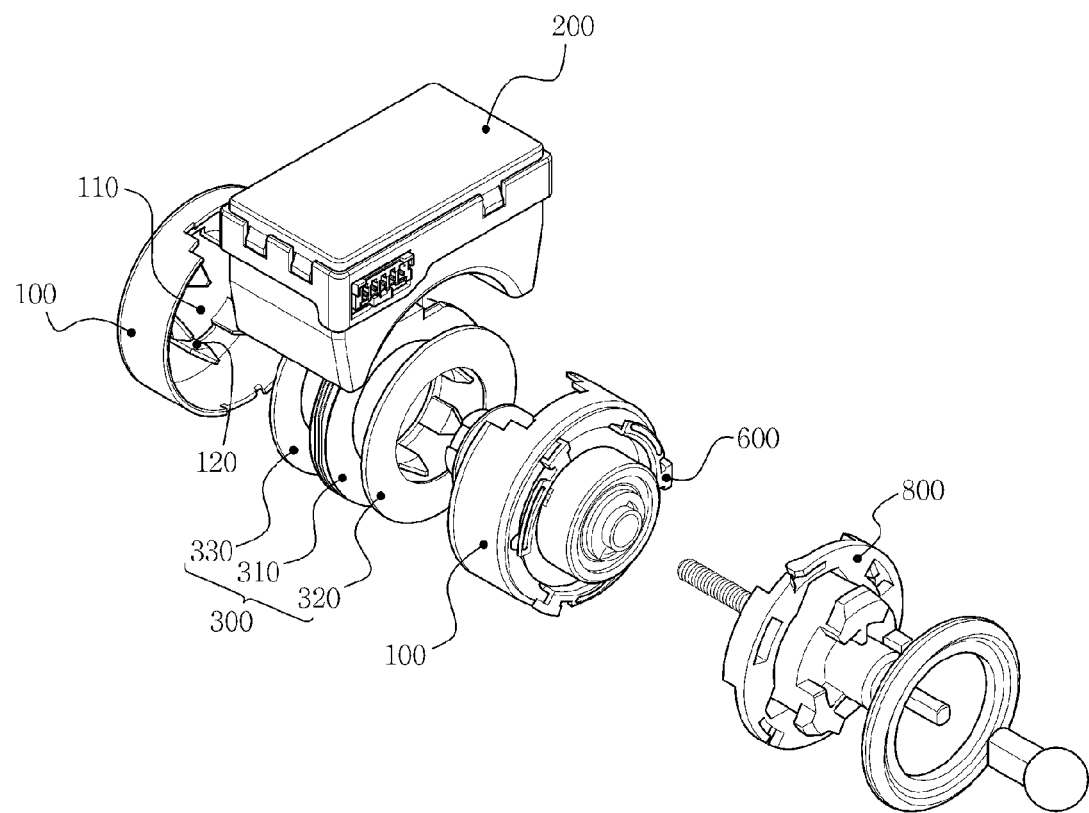
FIG. 3 is an exploded perspective view of a linear stepping motor according to an examplary embodiment of the present invention.

A linear stepping motor according to the exemplary embodiments of the present invention will be described in detail with reference to the accompanying drawings.

In the drawings, the size and relative sizes of constituent elements may be exaggerated for clarity and convenience.

Furthermore, in describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 4:
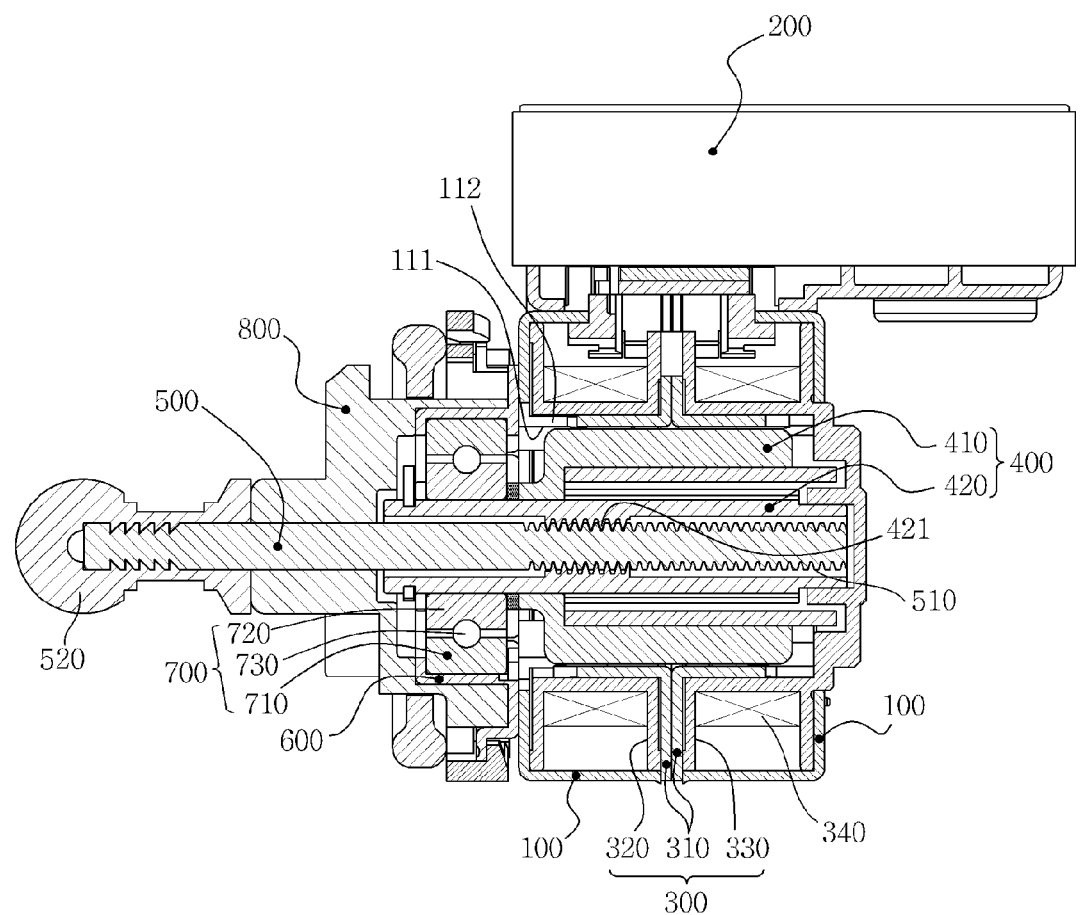
FIG. 4 is a longitudinal cross-sectional view of a coupled state in a linear stepping motor according to an examplary embodiment of the present invention.
Figure 5:
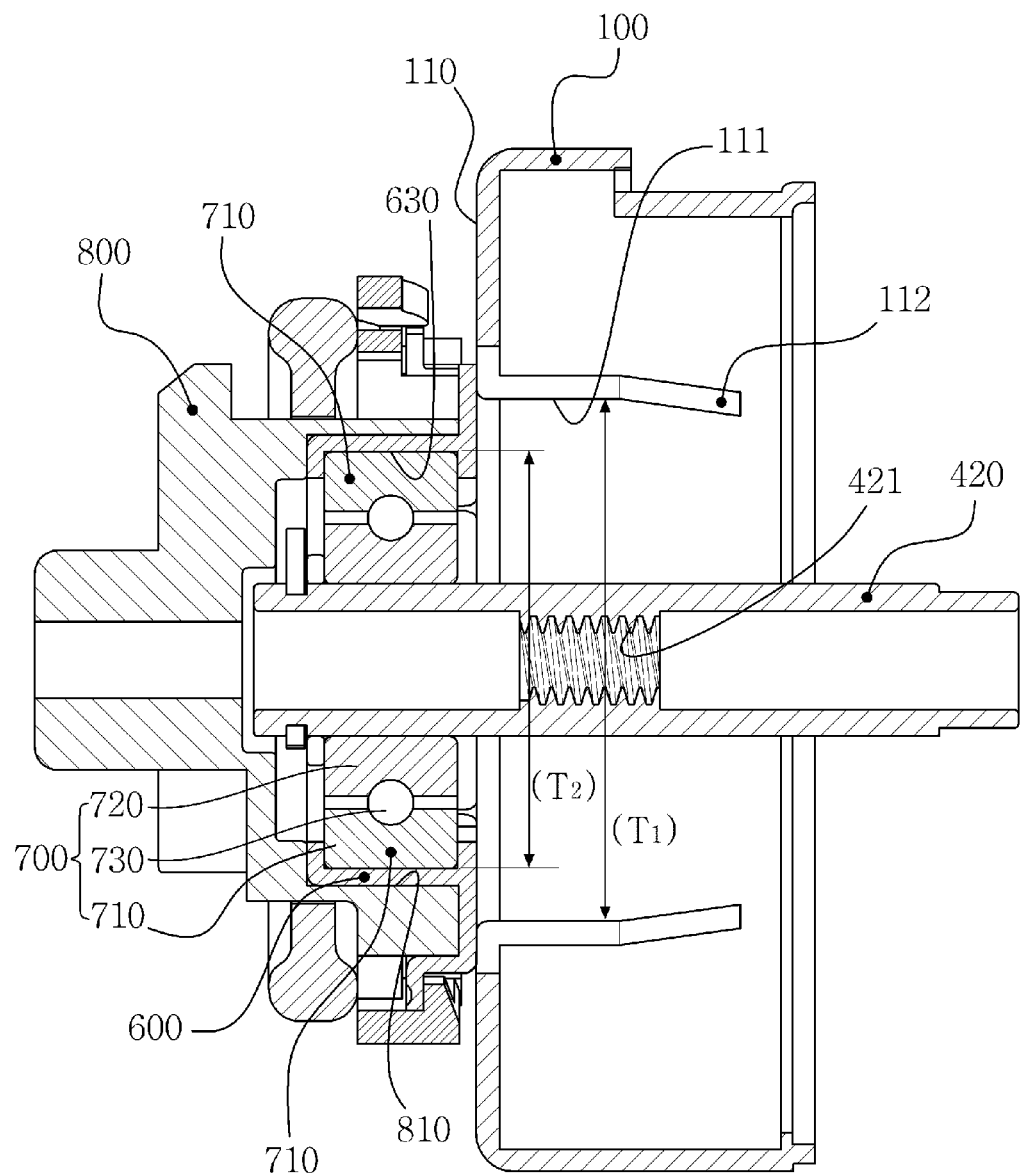
FIG. 5 is a partial cross-sectional view of essential elements of a linear stepping motor.

FIG. 3 is an exploded perspective view of a linear stepping motor according to an examplary embodiment of the present invention, FIG. 4 is a longitudinal cross-sectional view of a coupled state in a linear stepping motor according to an examplary embodiment of the present invention and FIG. 5 is a partial cross-sectional view of essential elements of a linear stepping motor.

Referring to FIGS. 3 to 5, a linear stepping motor according to an exemplary embodiment of the present invention includes a housing 100, a stator 300 installed inside the housing 100, a rotor 400 rotatively installed inside the stator 300 to be rotated in mutual operation with the stator 300, and a lead screw 500 linearly and movably installed inside the rotor 400 to linearly move in association with the rotating movement of the rotor 400.

The housing 100 is formed with a tooth 112 extended from one side of a lateral wall 110 to form a central hole 111. The housing 100 is externally mounted with a control box 200 embedded with a printed circuit board (PCB) for controlling a rotation angle of the motor.

The stator 300 includes a tooth yoke 310, and first and second coil bobbins 320, 330 installed in parallel outside of the tooth yoke 310 and wound with coils 340.

The rotor 400 includes a magnet 410 rotatively installed inside the tooth yoke 310 at a predetermined gap, and a female screw 420 formed thereinside with a female screw thread 421 for rotating in association with the magnet 410.

The lead screw 500 is linearly and movably arranged inside the female screw 420 and is peripherally formed with a male screw 510 that is meshed with the female screw 421. A distal end of the lead screw 500 is so configured as to be extracted to the outside of the housing 100 and is mounted with a joint 520 connected to a mechanism that receives a driving power.

For example, the mechanism may be a headlight of an automobile. That is, in a case the linear stepping motor according to the present invention is used as an actuator of illumination angle adjusting apparatus capable of adjusting a light illumination angle of a headlight, the joint 520 may be connected to one side of a support member of the headlight to adjust an illumination angle of the headlight.

Furthermore, the housing 100 is installed at one side thereof with a mounting plate 800 that connects the linear stepping motor to a mechanism that receives a driving power of the linear stepping motor. The mounting plate 800 is installed with a bearing 700 which in turn rotatatably supports the female screw 420.

The bearing 700 includes an external member 710, an internal member 720 formed inside the external member 710 for insertion by the female screw 420, and a ball 730 supportively and rotatably interposed between the external member 710 and the internal member 720. A plate cover 600 is formed between the mounting plate 800 and the housing 100 for fixing the mounting plate 800 to the housing 100 and supporting the bearing 700 lest the bearing 700 should be axially moved.

Figure 6:
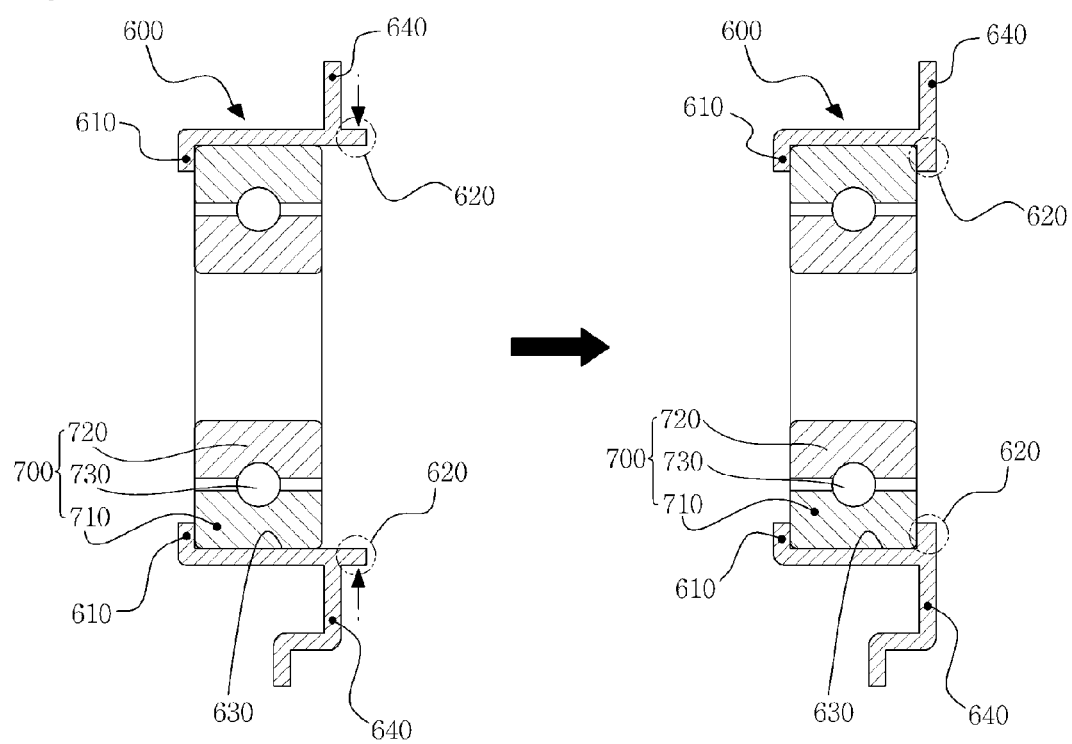
FIG. 6 is a cross-sectional view of a plate cover of a linear stepping motor according to an examplary embodiment of the present invention.

FIG. 6 is a cross-sectional view of a plate cover of a linear stepping motor according to a first examplary embodiment of the present invention.

Referring to FIG. 6, the plate cover 600 includes a pocket unit 630 into which the bearing 700 is inserted, a first support unit 610 formed at a distal end of the pocket unit 600 to support one lateral surface of the bearing 700, and a second support unit 620 formed at the other distal end of the bearing 700 to support the other surface of the bearing 700.

An inner diameter T1 of the tooth 112 forming a central hole 111 by being extended from a lateral wall 110 of the housing 100 may be greater than an outer diameter T2 of the bearing 700. The first and second support units 610,620 may be formed by a bent created by inwardly bending a distal end of the pocket unit 630, for example.

That is, the first support unit 610, as illustrated in FIG. 6, is formed by pre-bending through press-work prior to insertion of the bearing 700 into the pocket unit 630. Therefore, a structure may be provided in which the bearing 700 is inserted into the pocket unit 630 and then, the first support unit 610 is formed that is formed by forcibly bending the other distal end of the pocket unit 630 toward the other surface of the bearing 700, and the bearing 700 is secured inside the pocket unit 630.

Figure 7:
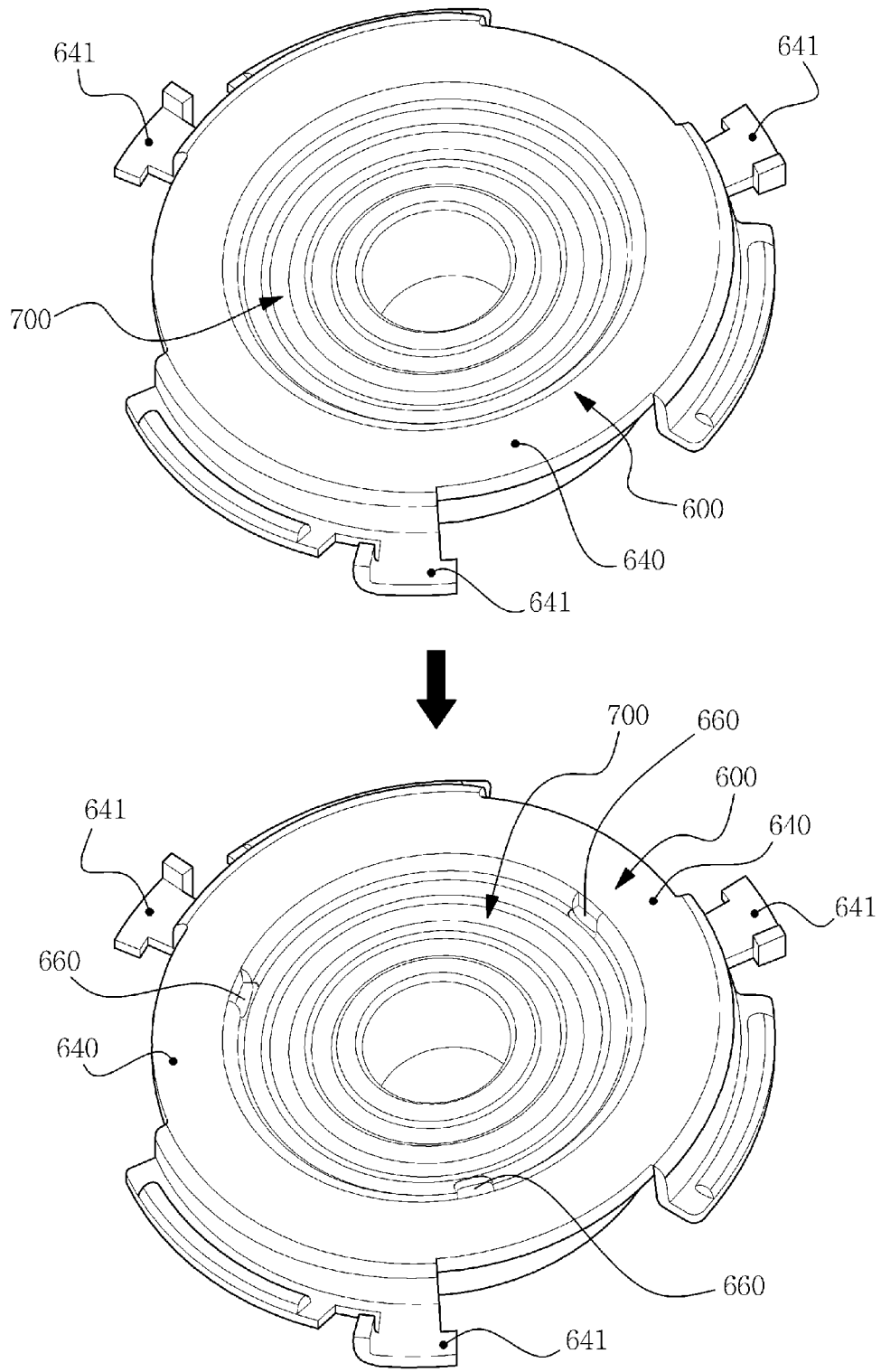
FIG. 7 is a perspective view of a plate cover of a linear stepping motor according to another examplary embodiment of the present invention.
Figure 8:
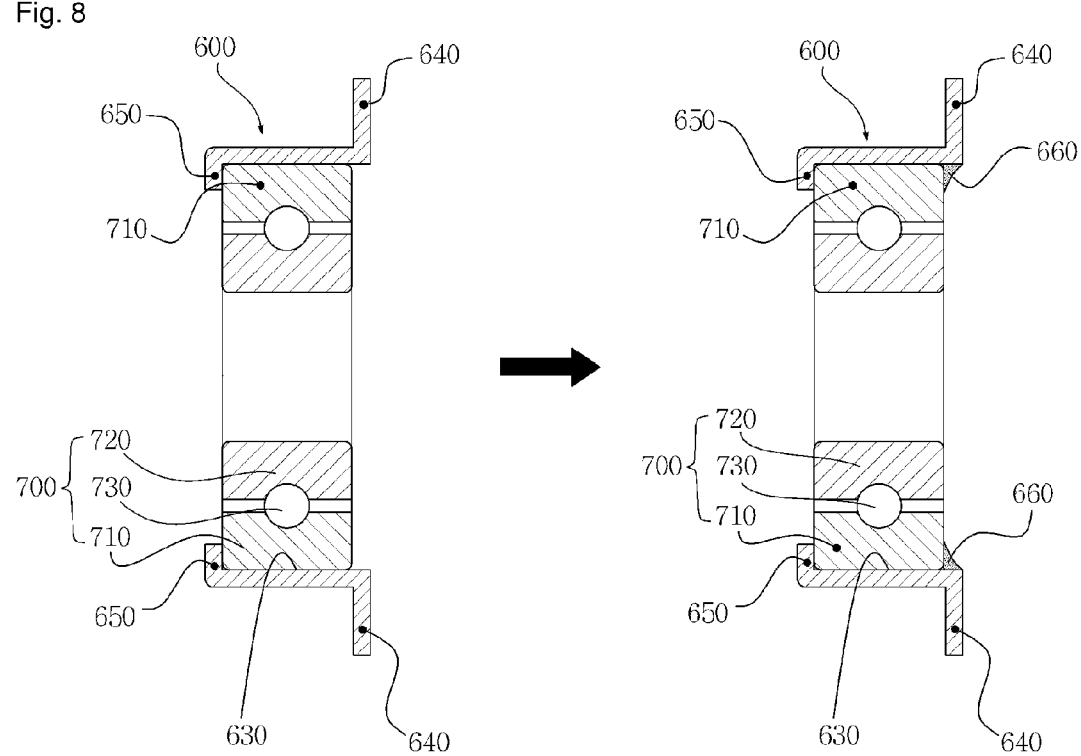
FIG. 8 is a cross-sectional view of a plate cover of a linear stepping motor according to another examplary embodiment of the present invention.

FIG. 7 is a perspective view of a plate cover of a linear stepping motor according to a second examplary embodiment of the present invention, and FIG. 8 is a cross-sectional view of a plate cover of a linear stepping motor according to the second examplary embodiment of the present invention.

A plate cover 600 according to the second exemplary embodiment of the present invention may include a first support unit 650 formed by bending a distal end of the pocket unit 630 through a press-work prior to insertion of the bearing 700, and a second support unit 660 (which is formed in at least one or more caulked shapes) formed by caulking the other distal end of the pocket unit 630 toward the bearing 700 using for instance a chisel posterior to the bearing 700 being inserted into the pocket unit 630, whereby the bearing 700 can be securely fixed inside the pocket unit 630.

In other words, the plate cover 600 according to the second exemplary embodiment of the present invention includes the first support unit 650 formed in a bent shape, and the second support unit 660 formed in at least one or more caulked shapes.

In still another exemplary embodiment, the plate cover 600 formed with the first and second support units 650,660, where both the first and second support units 650,660 are formed in at least one or more caulked shapes. It should be apparent that one of the first or second support unit may be caulked while the other may be formed in a combined bent shape.

Furthermore, the plate cover 600 is mounted with a fixation unit 640 extended to the external direction from a distal end of the other side of the pocket unit 630 and fixed at the lateral surface 110 of the housing 100.

The fixation unit 640 is formed with at least one or more coupling protruders 641 and the coupling protruder 641 is press-fitted into a coupling slot formed at the mounting plate 800. The mounting plate 800 is formed with an insertion groove 810 into which the pocket unit 630 of the plate cover 600 is inserted.

Thus, because the bearing 700 is fixed by the plate cover 600 itself, the size of the central hole 110 can be freely designed regardless of the size of the outer diameter of the bearing 700.

Furthermore, because the size of the central hole 110 can be freely designed, it is possible to enlarge the outer diameter of the magnet 410 that passes through the central hole 110 to enable obtainment of a larger output even in the same grade of linear stepping motor.

The linear stepping motor according to the present invention is still further advantageous in that first and second outer wheel fixation units 610,620 enable a simple fixation of the bearing 700 to prevent the bearing from axially moving, and noise and vibration caused by the moving bearing 700 can be prevented.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

Industrial Applicability

The linear stepping motor according to the present invention has an industrial applicability in that a bearing can be securely fixed in a simple structure by a plate cover itself to allow a free design in the size of a central hole of a housing or the size of an outer diameter of a magnet regardless of the size of outer diameter of the bearing, and the bearing is securely fixed to the plate cover by caulking to prevent the bearing from moving axially, whereby vibration and noise can be remarkably reduced to enhance the reliability of the product.

The invention claimed is:

1. A linear stepping motor, comprising:
   a housing;
   a stator disposed within the housing, the stator including a tooth yoke and a coil bobbin wound with a coil and disposed outside of the tooth yoke;
   a rotor rotatably disposed at an inner side of the stator, the rotor including a magnet that is rotatably disposed inside the tooth yoke and opposite the coil and including a screw that is threaded to a lead screw and rotates with the magnet; and
   a plate cover coupling to the housing and configured to prevent a bearing that rotatably supports the screw from axially moving,
   wherein the plate cover includes:
   a pocket unit into which the bearing is inserted;
   a first support unit formed at one distal end of the pocket unit, supporting one lateral surface of the bearing; and
   a second support unit formed at another distal end of the pocket unit, supporting another lateral surface of the bearing, wherein the second support unit comprises at least one groove formed on a circumference of the second support unit;
   wherein an inner diameter of the tooth yoke is greater than an outer diameter of the bearing.

2. The motor of claim 1, wherein the first support unit and the second support unit include bending portions at both distal ends of the pocket unit to be hitched at both lateral surfaces of the bearing.

3. The motor of claim 1, wherein the first support unit and the second support unit include at least one caulking portion.

4. The motor of claim 1, wherein one of the first support unit and the second support unit includes a bending portion or a caulking portion.

5. The motor of claim 1, further comprising a mounting plate coupling to the plate cover and the housing for passing the lead screw,
   wherein the pocket unit is inserted into an insertion groove part formed at the mounting plate.

6. The motor of claim 1, wherein the housing is formed with a tooth forming a central hole, and wherein an inner diameter of the tooth is larger than an outer diameter of the bearing.

7. The motor of claim 1, further comprising a mounting plate coupling to the plate cover and the housing for passing the lead screw,
   wherein the plate cover includes a fixation unit extended from the another distal end of the pocket unit in an outward direction to be fixed at a lateral surface of the housing, and a coupling protruder formed at the fixation unit to be press-fitted to a coupling slot formed at the mounting plate.

8. The motor of claim 1, wherein the first support unit and the second support unit support two lateral surfaces of an external member of the bearing, respectively.

9. An illumination angle adjusting apparatus for an automobile, comprising:
   an automobile body having a headlight; and
   a motor for actuating an illumination angle adjusting apparatus configured to adjust an illumination angle of the headlight,
   wherein the motor includes:
   a housing disposed in an automobile;
   a stator disposed within the housing, the stator including a tooth yoke and a coil bobbin wound with a coil and disposed outside of the tooth yoke;
   a rotor rotatably disposed at an inner side of the stator, the rotor including a magnet that is rotatably disposed inside the tooth yoke and is opposite the coil and including a screw that is threaded to a lead screw and rotates with the magnet; and
   a plate cover coupling to the housing, and configured to prevent a bearing that rotatably supports the screw from axially moving,
   wherein the plate cover includes:
   a pocket unit into which the bearing is inserted;
   a first support unit formed at one distal end of the pocket unit, directly touching and supporting one lateral surface of the bearing; and
   a second support unit formed at another distal end of the pocket unit, supporting another lateral surface of the bearing, wherein the second support unit comprises at least one groove formed on a circumference of the second support unit;
   wherein an inner diameter of the tooth yoke is greater than an outer diameter of the bearing.

* * * * *